(12) United States Patent
Shisheng et al.

(10) Patent No.: US 8,495,019 B2
(45) Date of Patent: Jul. 23, 2013

(54) SYSTEM AND METHOD FOR PROVIDING ASSURED RECOVERY AND REPLICATION

(75) Inventors: Liu Shisheng, Beijing (CN); Eric Harless, Farmingville, NY (US); Paul Puthur Ignatius, North Grafton, MA (US)

(73) Assignee: CA, Inc., Islandia, NY (US)

( * ) Notice: Subject to any disclaimer, the term of this patent is extended or adjusted under 35 U.S.C. 154(b) by 202 days.

(21) Appl. No.: 13/043,201

(22) Filed: Mar. 8, 2011

(65) Prior Publication Data

US 2012/0233123 A1    Sep. 13, 2012

(51) Int. Cl.
*G06F 17/30* (2006.01)

(52) U.S. Cl.
USPC ............................................................. 707/639

(58) Field of Classification Search
USPC ........................................ 707/639, 674–677
See application file for complete search history.

(56) References Cited

U.S. PATENT DOCUMENTS

| | | | |
|---|---|---|---|
| 4,328,580 A | 5/1982 | Stockham, Jr. et al. | 371/8 |
| 4,677,558 A | 6/1987 | Bohmler et al. | 364/431.04 |
| 4,858,131 A | 8/1989 | Sugimura et al. | 364/424.1 |
| 5,133,065 A | 7/1992 | Cheffetz et al. | 714/2 |
| 5,163,148 A | 11/1992 | Walls | 711/162 |
| 5,247,444 A | 9/1993 | Arai et al. | 364/431.05 |
| 5,263,154 A | 11/1993 | Eastridge et al. | 714/6 |
| 5,355,449 A | 10/1994 | Lung et al. | 395/150 |
| 5,384,912 A | 1/1995 | Ogrinc et al. | 395/164 |
| 5,426,774 A | 6/1995 | Banerjee et al. | 395/575 |
| 5,446,875 A | 8/1995 | Ogisu et al. | 395/575 |
| 5,479,654 A | 12/1995 | Squibb | 395/600 |
| 5,522,037 A | 5/1996 | Kitagawa et al. | 714/40 |
| 5,546,534 A | 8/1996 | Malcolm | 395/182.04 |
| 5,566,297 A | 10/1996 | Devarakonda et al. | 395/182.13 |

(Continued)

FOREIGN PATENT DOCUMENTS

| | | |
|---|---|---|
| EP | 0 268 139 | 5/1988 |
| EP | 0 314 250 | 5/1989 |

(Continued)

OTHER PUBLICATIONS

Notification of Transmittal of the International Search Report or the Declaration (PCT Rule 44.1) mailed Oct. 9, 2001 corresponding to International Application No. PCT/US01/06820 filed Mar. 1, 2001, 7 pages.

(Continued)

*Primary Examiner* — Thu-Nguyet Le
(74) *Attorney, Agent, or Firm* — Pillsbury Winthrop Shaw Pittman LLP

(57) ABSTRACT

The system and method for providing assured recovery and replication described herein may recover a master data source from a replica data source without impacting the master data source or the replica data source, and without having to install a standby version of an application associated with the master data source. In particular, a master snapshot may be created to copy application data stored in the master data source, wherein a replication server confirms that the replica data source can recover the master data source if the master snapshot and the replica data source are consistent. The replication server may create a replica snapshot to copy the replica data source and assign an identity associated with the master data source to the replica data source to recover the master data source. As such, replication may be resumed on a virtual machine disk file associated with the replica snapshot.

28 Claims, 3 Drawing Sheets

U.S. PATENT DOCUMENTS

| | | | | |
|---|---|---|---|---|
| 5,574,906 | A | 11/1996 | Morris | 395/601 |
| 5,590,040 | A | 12/1996 | Abe et al. | 364/424.04 |
| 5,615,364 | A | 3/1997 | Marks | 707/999.202 |
| 5,634,052 | A | 5/1997 | Morris | 395/601 |
| 5,659,614 | A | 8/1997 | Bailey, III | 380/4 |
| 5,664,186 | A | 9/1997 | Bennett et al. | 1/1 |
| 5,664,231 | A | 9/1997 | Postman et al. | 395/893 |
| 5,671,374 | A | 9/1997 | Postman et al. | 395/309 |
| 5,675,725 | A | 10/1997 | Malcolm | 395/182.04 |
| 5,689,513 | A | 11/1997 | Okita et al. | 371/20.1 |
| 5,720,026 | A | 2/1998 | Uemura et al. | 395/182.04 |
| 5,765,173 | A | 6/1998 | Cane et al. | 1/1 |
| 5,799,147 | A | 8/1998 | Shannon | 714/6 |
| 5,806,078 | A | 9/1998 | Hug et al. | 707/511 |
| 5,812,840 | A | 9/1998 | Shwartz | 395/604 |
| 5,813,017 | A | 9/1998 | Morris | 707/204 |
| 5,832,520 | A | 11/1998 | Miller | 707/203 |
| 5,852,713 | A | 12/1998 | Shannon | 714/6 |
| 5,859,971 | A | 1/1999 | Bittinger et al. | 395/200.33 |
| 5,860,071 | A | 1/1999 | Ball et al. | 707/100 |
| 5,875,290 | A | 2/1999 | Bartfai et al. | 395/182.1 |
| 5,905,866 | A | 5/1999 | Nakabayashi et al. | 395/200.53 |
| 5,931,904 | A | 8/1999 | Banga et al. | 709/217 |
| 5,974,563 | A | 10/1999 | Beeler, Jr. | 714/5.11 |
| 5,987,575 | A | 11/1999 | Yamaguchi | 711/162 |
| 6,014,669 | A | 1/2000 | Slaughter et al. | 707/10 |
| 6,044,444 | A | 3/2000 | Ofek | 711/162 |
| 6,088,694 | A | 7/2000 | Burns et al. | 1/1 |
| 6,092,066 | A | 7/2000 | Ofek | 1/1 |
| 6,101,497 | A | 8/2000 | Ofek | 707/657 |
| 6,233,589 | B1 | 5/2001 | Balcha et al. | 707/203 |
| 6,260,124 | B1 | 7/2001 | Crockett et al. | 711/162 |
| 6,282,610 | B1 | 8/2001 | Bergsten | 711/114 |
| 6,513,052 | B1 | 1/2003 | Binder | 707/204 |
| 6,526,419 | B1 | 2/2003 | Burton et al. | 707/204 |
| 6,622,259 | B1 | 9/2003 | Schmuck | 714/4 |
| 6,711,572 | B2 | 3/2004 | Zakharov et al. | 707/655 |
| 6,950,871 | B1 | 9/2005 | Honma et al. | 709/226 |
| 6,959,369 | B1 | 10/2005 | Ashton et al. | 711/162 |
| 7,043,485 | B2 | 5/2006 | Manley et al. | 707/100 |
| 7,055,059 | B2 | 5/2006 | Yanai et al. | 714/6.32 |
| 7,085,860 | B2 | 8/2006 | Dugan et al. | 710/36 |
| 7,139,782 | B2 | 11/2006 | Osaki | 1/1 |
| 7,152,183 | B2 | 12/2006 | Fujibayashi | 714/6.31 |
| 7,570,586 | B1 | 8/2009 | Albert et al. | 370/229 |
| 7,620,040 | B2 | 11/2009 | Bhaskaran | 370/389 |
| 7,730,031 | B2 | 6/2010 | Forster | 707/625 |
| 7,761,616 | B2 | 7/2010 | Vageline | 710/14 |
| 7,840,535 | B2 | 11/2010 | Barboi et al. | 707/634 |
| 8,019,730 | B2 | 9/2011 | Forster | 707/667 |
| 8,019,731 | B2 | 9/2011 | Forster | 707/667 |
| 2002/0010702 | A1 | 1/2002 | Ajtai et al. | 707/101 |
| 2002/0178360 | A1 | 11/2002 | Wenocur et al. | 713/170 |
| 2003/0212920 | A1 | 11/2003 | Fujibayashi | 714/7 |
| 2004/0083245 | A1 | 4/2004 | Beeler, Jr. | 1/1 |
| 2004/0220980 | A1 | 11/2004 | Forster | 1/1 |
| 2005/0021869 | A1 | 1/2005 | Aultman et al. | 709/249 |
| 2005/0065986 | A1 | 3/2005 | Bixby et al. | 707/204 |
| 2006/0031594 | A1 | 2/2006 | Kodama | 710/5 |
| 2006/0101097 | A1 | 5/2006 | Barboi et al. | 1/1 |
| 2006/0218203 | A1* | 9/2006 | Yamato et al. | 707/200 |
| 2007/0106712 | A1* | 5/2007 | Yamato et al. | 707/204 |
| 2007/0112892 | A1 | 5/2007 | Langley et al. | 707/204 |
| 2008/0162605 | A1* | 7/2008 | Tsuchiya | 707/204 |
| 2010/0174685 | A1 | 7/2010 | Forster | 707/667 |
| 2011/0010345 | A1 | 1/2011 | Forster | 707/661 |

FOREIGN PATENT DOCUMENTS

| | | |
|---|---|---|
| EP | 0 410 630 | 1/1991 |
| EP | 0 692 121 | 1/1996 |
| EP | 0 769 741 | 4/1997 |
| EP | 0 774 715 | 5/1997 |
| EP | 0 836 145 | 4/1998 |
| EP | 0 880 096 | 11/1998 |
| EP | 0 899 662 | 3/1999 |
| EP | 0 921 466 | 6/1999 |
| EP | 0 921 467 | 6/1999 |
| EP | 0 965 908 | 12/1999 |
| EP | 0 981 090 | 2/2000 |
| JP | 7-084728 | 3/1995 |
| JP | 7-110783 | 4/1995 |
| JP | 9-323805 | 12/1997 |
| JP | 10-021250 | 1/1998 |
| JP | 10-171694 | 6/1998 |
| JP | 11-212875 | 8/1999 |
| JP | 11-168555 | 1/2001 |
| WO | WO 94/10630 | 5/1994 |
| WO | WO 94/23377 | 10/1994 |
| WO | WO 95/01599 | 1/1995 |
| WO | WO 95/19599 | 7/1995 |
| WO | WO 95/30184 | 11/1995 |
| WO | WO 96/29650 | 9/1996 |
| WO | WO 97/15890 | 5/1997 |
| WO | WO 97/31319 | 8/1997 |
| WO | WO 99/09480 | 2/1999 |
| WO | WO 99/12098 | 3/1999 |
| WO | WO 99/12101 | 3/1999 |
| WO | WO 99/57658 | 11/1999 |

OTHER PUBLICATIONS

Oracle® Database Advanced Replication Management APR Reference, 10g Release 1, Part No. B10733-01, Dec. 2003, Oracle®, 702 pages.

Page, Jr., Thomas W., et al., "Management of Replicated Volume Location Data in the Ficus Replicated File System", *Proceedings of the Summer USENIX Conference*, Jun. 1991, pp. 17-29 (13 pages).

Popek, Gerald J., et al., "Replication in Ficus Distributed Systems", *Proceedings of the Workshop on Management of Replicated Data*, Nov. 1990, pp. 20-25 (6 pages).

Guy, Richard G., et al., "Implementation of the Ficus Replicated File System", *Proceedings of the Summer USENIX Conference*, Anaheim, California, Jun. 1990, pp. 63-71 (10 pages).

Lo, Sai-Lai, "*Ivy*: A Study of Replicating Data for Performance Improvement", Hewlett-Packard Laboratories Concurrent Computing Department, Dec. 14, 1990, HPL-CSP-90-48, pp. 1-39 (40 pages).

Bhide, Anupam, et al., "A Comparison of Two Approaches to Build Reliable Distributed File Servers", *Proceedings of the 11th International Conference on Distributed Computing Systems*, May 1991, pp. 616-623 (8 pages).

Bhide, Anupam, et al., "A Highly Available Network File Server", Proceedings of the USENIX Winter Conference 1991, Jan. 1991, pp. 199-205 (10 pages).

Bhide, Anupam, et al., "Implicit Replication in a Network File Server", *Proceedings of the Workshop on Management of Replicated Data*, Nov. 1990, 6 pages.

"CA XOsoft™ Replication and CA XOsoft™ High Availability to Support Flexible Business Continuity Over Any 'Distance'", Product Family Brief: CA XOSOFT, MP324990108, Copyright 2008 CA, 12 pages.

White Paper: "Improving Microsoft Exchange Server Recovery with EMC RecoverPoint: Applied Technology", Dec. 2008, 13 pages.

* cited by examiner

SYSTEM AND METHOD FOR PROVIDING ASSURED RECOVERY AND REPLICATION

FIELD OF THE INVENTION

The invention generally relates to a system and method for providing assured recovery and replication, and in particular, to validating consistency between a master data source and a replica data source without impacting live operations on the master data source or replication operations on the replica data source, and further to recovering the master data source from the replica data source without having to install an application associated with the master data source in a replica site that contains the replica data source.

BACKGROUND OF THE INVENTION

Today, many (if not all) organizations tend to conduct substantial amounts of business electronically, and consequently, depend on having reliable, continuous access to information technology systems, applications, and resources in order to effectively manage business endeavors. At the same time, information technology threats ranging from viruses, "malware," and data corruption to application failures and natural disasters are growing in number, type, and severity, while current trends in technology have presented information technology departments with a plethora of recurring challenges. For example, the need to do business at an increasingly faster pace with larger critical data volumes have amplified the pressure on information technology, which has led to efforts that relate to consolidating, migrating, or virtualizing servers and resources hosted thereon without disrupting operations or damaging resources. As such, even isolated failures have the potential to render information technology resources unavailable, which may cause organizations to lose substantial amounts of revenue or information that could impede or even cripple business.

Moreover, the current trends within the information technology community often exacerbate problems that result from data corruption, failures, and other threats interfering with resource availability. For example, a few years ago, losing connectivity to an e-mail server may have been nothing more than a nuisance to many organizations, but today the same issue could potentially result in tremendous productivity losses, customer dissatisfaction, and poor public image. Thus, the dynamic nature associated with information technology environments makes critical that system testing and personnel training occur on a regular basis and at proper levels, especially due to ongoing needs that relate to replacing hardware, upgrading software, dealing with personnel coming and going, and other inevitable changes. Additionally, many government regulations on information availability and security require that crucial data needed to certify compliance with reporting requirements be archived for subsequent retrieval. For example, healthcare organizations must demonstrate compliance with Health Insurance Portability and Accountability Act requirements, public companies and organizations in the accounting industry must demonstrate compliance with Sarbanes-Oxley requirements, and financial institutions must demonstrate compliance with Graham-Leach-Bliley requirements. Further, even if an organization does not have to meet certain standards to comply with legal requirements, serious risks may arise unless business continuity and disaster recovery are elevated to a strategic level.

However, although these and other concerns can substantially impact performance and governance, risk, and compliance concerns associated with disaster recovery systems, existing techniques that seek to address such problems tend to fall short in suitably carrying out tests that less disruptive, more proactive, and more frequent than reactive, live tests. As a result, the existing techniques often fail to adequately detect problems early and avoid expensive costs and downtime associated with fixing such problems. For example, one existing technique to address availability, reliability, and integrity associated with information technology environments includes real-time data replication, whereby multiple copies of a data source may be maintained at multiple locations in order to have an up-to-date copy immediately available should the primary copy be lost. However, real-time data replication has various weaknesses, including that if data has been damaged or corrupted at a source site, the corruption will most likely be immediately replicated to the target or standby site. In particular, corruption leads to data becoming unusable, wherein human error, application flaws, viruses, or other issues may cause the data corruption. As such, existing techniques that perform real-time data replication typically cannot determine that a specific piece of information has been rendered unusable because the system is simply carrying out the assigned task to ensure that the target or standby site constantly represents an up-to-date replica of the data at the source site. Consequently, if data corruption that cannot be addressed with real-time replication alone, data protection gaps may arise, especially because traditional approaches typically restore information from the last backup or snapshot, which may potentially cause stale information to be restored.

Furthermore, certain applications and data often do not require real-time replication or failover capabilities, whereby tape and disk backup systems are still critical to overall business continuity plans. However, less experienced staff frequently manage backup hardware and physical media at remote or branch offices, and in many cases, remote or branch offices are run without any support information technology staff. For these and other reasons, remote or branch offices tend to fly under the radar when monitoring backup success, testing recovery procedures, and following security and maintenance protocols, which can lead to failure-prone recovery processes and unnecessary administrative overhead in the remote or branch offices. Accordingly, the various factors and problems discussed above translate into an ever-important need to protect businesses and other organizations that rely upon information technology against potential disruption to personnel operations, physical operations, and lost access to information technology resources. Moreover, in cases where disruption does occur, existing systems tend to fall short in adequately restoring information technology resources to a current and healthy state as rapidly as possible.

SUMMARY OF THE INVENTION

According to one aspect of the invention, a system and method for providing assured recovery and replication may provide various features to ensure that a master data source associated with an application will be immediately accessible in emergency or other failure scenarios, wherein a replica data source maintained at a replica site may provide substantially instantaneous failover and restoration in response to any loss or disruption associated with the master data source. Moreover, the system and method described herein may ensure that a master site associated with the master data source will be prepared to handle actual threats because disaster recovery resources associated with the replica site may proactively test whether the replica data source can be reliably utilized to recover the master data source in response to disaster, loss, or other failure associated therewith.

According to one aspect of the invention, the system and method described herein may check whether the master data source associated with the application has a healthy state, wherein the replica site may include a replication server that can check a replica data source associated with the master data source to verify that the application has a healthy state without substantial impact on replication in the replica site. In one implementation, to comprehensively and automatically test the application, the replication server may load a standby version of the application in the replica site and then test the standby version of the application and the replica data source associated therewith out disrupting the production version of the application or interrupting real-time protection for the master data source. For example, in response to the production application in the master site applying changes to the master data source, the standby application may apply the changes to the replica data source. In one implementation, a replication client at the master site may use a device driver or another suitable mechanism to redirect any changes applied with the production version of the application to the replica site, whereby the changes may be replicated on the replica data source without impacting the master data source or the production version of the application at the master site. Thus, in response to suitably replicating the changes to the master data source on the replica data source, the device driver may be unloaded and replication may be appropriately repeated in response to any subsequent changes that the production version of the application applies to the master data source. Further, in one implementation, the changes applied to the replica data source may be recorded in a rewind log to preserve a context associated with the application, whereby the changes recorded in the rewind log may be used to rewind the replica data source and/or the master data source to a point where business operations can be suitably resumed in response to disaster or other failure scenarios.

According to one aspect of the invention, the system and method described herein may alternatively provide assured recovery for the master data source without loading or installing the standby version of the application in the replica site. In particular, loading or otherwise installing the standby version of the application in the replica site may introduce additional costs to buy and manage the application even though certain customers or users may only need the replica site to provide disaster recovery or failover services. Thus, the replica server may be configured to perform various data consistency checks to provide assured recovery for the master data source without necessarily loading the standby version of the application in the replica site. For example, the replica server may maintain various offline backup data sources that store different snapshots of the master data source and the replica data source, wherein the snapshots maintained in the offline backup data sources may be used to recover deleted files or data older than current versions in the master data source or the replica data source. Additionally, the replica server may maintain one or more bookmarks or other integration points that can be used to backup or restore the master data source with the replica data source without disrupting real-time protection for the master data source in the master site. In one implementation, each scenario described above may include recording any changes to the master data source that are replicated on the replica data source in the rewind log to preserve the application context for restoring the replica data source and/or the master data source.

According to one aspect of the invention, the system and method described herein may perform an assured recovery test to verify that the replica data source can suitably recover the master data source in response to disaster, loss, or other failure associated therewith. In one implementation, the assured recovery test may generally be performed at any suitable time to establish initial consistency between the master data source and the replica data source and thereby assure that the master data source and the replica data source are identical. For example, establishing consistency between the master data source and the replica data source may include appropriately updating the replica data source to reflect any ongoing changes that may be applied to the master data source, wherein any live changes that the application applies to the master data source may be flowed to the replica server, which may appropriately replicate the changes on the replica data source. In one implementation, a volume snapshot service at the master site may be invoked to create a master snapshot that represents a copy associated with the master data source, wherein the volume snapshot service may then store the master snapshot to enable the master data source to be recovered to a point in time when the master snapshot was created. In response to suitably creating the master snapshot, the volume snapshot service may record an application-aware bookmark that associates the master snapshot with the application that interacts with the master data source (e.g., to distinguish the particular application associated with the master snapshot from master snapshots created from master data sources associated with other applications). In response to recording the bookmark associated with the master snapshot, consistency between the replica data source and the master snapshot may then be verified.

According to one aspect of the invention, the system and method described herein may compare metadata that describes the replica data source to metadata that describes the master snapshot to verify that the replica data source and the master snapshot are in a consistent state (e.g., determining whether any differences exist between the metadata that describes the replica data source and the metadata that describes the master snapshot). As such, in response to determining that no differences exist between the metadata associated with the replica data source and the master snapshot, the replica data source and the master snapshot may be verified to have a consistent state, wherein the replication server may then capture a snapshot of the replica data source to preserve the consistent state. Alternatively, in response to identifying any differences between the metadata describing the replica data source and the master snapshot, the system and method described herein may attempt to resolve the differences or skip capturing the snapshot of the replica data source until a subsequent test successfully verifies consistency between the master snapshot and the replica data source. Alternatively, in one implementation, the differences may be resolved by determining whether the rewind log can be suitably used to restore the master data source and/or the replica data source to a prior consistent state (e.g., finding a nearest-in-time point where the replica data source and the master data source previously had a consistent state). In one implementation, verifying consistency between the replica data source and the master snapshot may alternatively (or additionally) include performing a binary difference comparison between the replica data source and the master snapshot. For example, the binary difference comparison may be performed on every aspect of a file system associated with the replica data source and the master data source to perform a full consistency check, or a Windows Change Journal mechanism may alternatively be used to limit the binary difference comparison to any files in the replica data source and/or the master data source that have changed since a prior comparison (e.g., to reduce response time associated with the test).

According to one aspect of the invention, the system and method described herein may suspend replication between the master data source and the replica data source during the assured recovery test, or alternatively replication between the master data source and the replica data source may continue during the assured recovery test. For example, in the former case, suspending replication between the master data source and the replica data source may include recording any changes applied to the master data source and spooling or otherwise accumulating the changes in a spool file at the replica site, wherein the changes accumulated in the spool file may be replicated on the replica data source in response to the assured recovery test completing. For example, in response to completing the assured recovery test, a rewind engine may restore the replica data source to a state prior to when the changes began to be accumulated in the spool file, wherein the replication server may replicate the accumulated changes on the replica data source in response to the rewind engine restoring the replica data source to the prior state. In one implementation, to restore the replica data source to the prior state, the rewind engine may use a rewind log that records any changes to the replica data source that occur while verifying consistency between the master data source and the replica data source (i.e., rewinding the changes that occurred during the verification test to restore the replica data source to the state that existed prior to the verification test). Furthermore, because suspending replication during the assured recovery test may result in the assured recovery test finding differences between the replica data source and the master snapshot, the rewind log may be further used to find a nearest-in-time point (prior to when replication was suspended) where the replica data source and the master data source had a consistent state and from where production operations can be continued. Alternatively, in the scenario where replication continues during the assured recovery test, the volume snapshot service may be invoked to copy the replica data source within a replica snapshot. As such, the assured recovery test may then compare the master snapshot to the replica snapshot (rather than the replica data source) to verify whether the replica data source and the master snapshot are consistent, whereby replication between the master data source and the replica data source may continue during the assured recovery test without impacting live operations on the master data source or replication operations on the replica data source.

According to one aspect of the invention, in response to suitably verifying that the replica data source and the master snapshot have a consistent state (or in response to finding the nearest-in-time point where the replica data source and the master data source had a consistent state), the system and method described herein may establish that the master data source and the replica data source were consistent with the application at a time when the bookmark associated with the master snapshot was created (or alternatively at the nearest-in-time point). As such, in response to establishing when the replica data source and the master data source had an identical and consistent state, the replica data source may be guaranteed to have an appropriate state to recover the master data source in response to disaster, loss, failure, or other any other suitable condition that may trigger recovering the master data source (e.g., the master data source may be monitored to detect any potential disaster, loss, or other failure in the master data source and then trigger the assured recovery, or the assured recovery may be triggered at a predefined time, according to a predefined schedule, or on-demand in response to a suitable request).

According to one aspect of the invention, as noted above, the system and method described herein may recover the master data source from the replica data source without loading or installing a standby version of the application. Further, because verifying consistency between the replica data source and the master snapshot may change the replica data source and/or the master snapshot, the rewind engine may reference a rewind log to roll back any changes to the replica data source that occurred during the assured recovery test and thereby restore the replica data source and/or the master snapshot to a state that existed prior to verifying consistency between the replica data source and the master data source (e.g., in a similar manner as described above). In one implementation, the rewind engine may further provide granular application-aware recovery from corruption in the master data source or the replica data source (e.g., restoring the master data source or the replica data source to a state prior to the corruption using information in a rewind log, snapshots previously created for the master data source or the replica data source, etc.).

According to one aspect of the invention, to recover the master data source from the replica data source, the system and method described herein may back up the replica data source to an offline backup data source to further protect the replica data source in case any errors or malfunctions occur while recovering the master data source, and saving the replica data source to the offline backup data source may further enable the replica data source to be used in recovering the master data source without having to install the application at the replica site. Furthermore, to provide assured recovery from the replica data source without installing a standby version of the application at the replica site, any information associated with the application and an operating system that runs the application may be replicated to a virtual machine disk file stored at the replica site. As such, in response to initiating the assured recovery from the replica data source, the replication server may invoke the volume snapshot service to create a disk snapshot from the virtual machine disk file, wherein the disk snapshot may be used to create a virtual machine image that represents a virtual instantiation associated with the application and the associated operating system. The replication server may then boot the virtual machine created from the virtual machine disk file to verify that the application and the associated operating system have a healthy state in the virtual machine. In response to confirming that the virtual machine has a healthy state, an identity associated with the master data source may then be assigned to the replica data source, whereby the replica data source may then be ready to recover the master data source. For example, assigning the identity associated with the master data source to the replica data source may transfer control from the master data source to the replica data source, whereby the replica data source may essentially replace the master data source. The disk snapshot previously created from the virtual machine disk file may then be reverted to create a new replica data source and replication between the new master data source (i.e., the previous replica data source) and the new replica data source may resume. As such, because the virtual machine disk file enables creating a virtual instantiation that represents the application and any associated services and data sources, assured recovery for the master data source may be provided from the replica data source without having to install the standby version of the application at the replica site.

According to one aspect of the invention, the system and method described herein may generate various reports to describe, among other things, delays in replicating the master data source on the replica data source, results from the assured recovery test that validates whether the master data source and the replica data source are in a consistent state, and results from performing assured recovery to recover the master data source from the replica data source. Thus, the system and method described herein may maintain various statistics that detail correctness and performance associated with replication between the master data source and the replica data source. For example, because the replication server may replicate the master data source to the replica data source asynchronously, delays may occur in replicating the master data source to the replica data source. The reports may therefore provide information describing any delays associated with replicating the master data source on the replica data source (e.g., the replication client, the replication server, or other suitable components may add timestamps into messages or data packages associated with replicating the master data source on the replica data source, wherein a reporting engine may generate the report to describe any delays that occur in various transfer phases associated with replicating the master data source on the replica data source from the timestamps added to the various messages or data packages (e.g., delays in the master site, in the replica site, in a network that couples the master site and the replica site, etc.). Additionally, the reporting engine may generate a report that describes whether the master data source and the replica data source are correctly replicating (or correctly configured to replicate). For example, the system and method described herein may generate data to be used in one or more operations that modify the master data source (e.g., randomly generated pseudo-data, real data that may be selected from the update log, etc.). As such, the operations may then be executed using the generated data to modify the master data source, and the replica data source may then be analyzed to determine whether or not the replica data source appropriately reflects any changes caused with the operations performed on the master data source. Accordingly, the reporting engine may generate a report indicating whether the master data source and the replica data source are correctly replicating (or correctly configured to replicate).

Other objects and advantages of the invention will be apparent to those skilled in the art based on the following drawings and detailed description.

DETAILED DESCRIPTION

Figure 1:
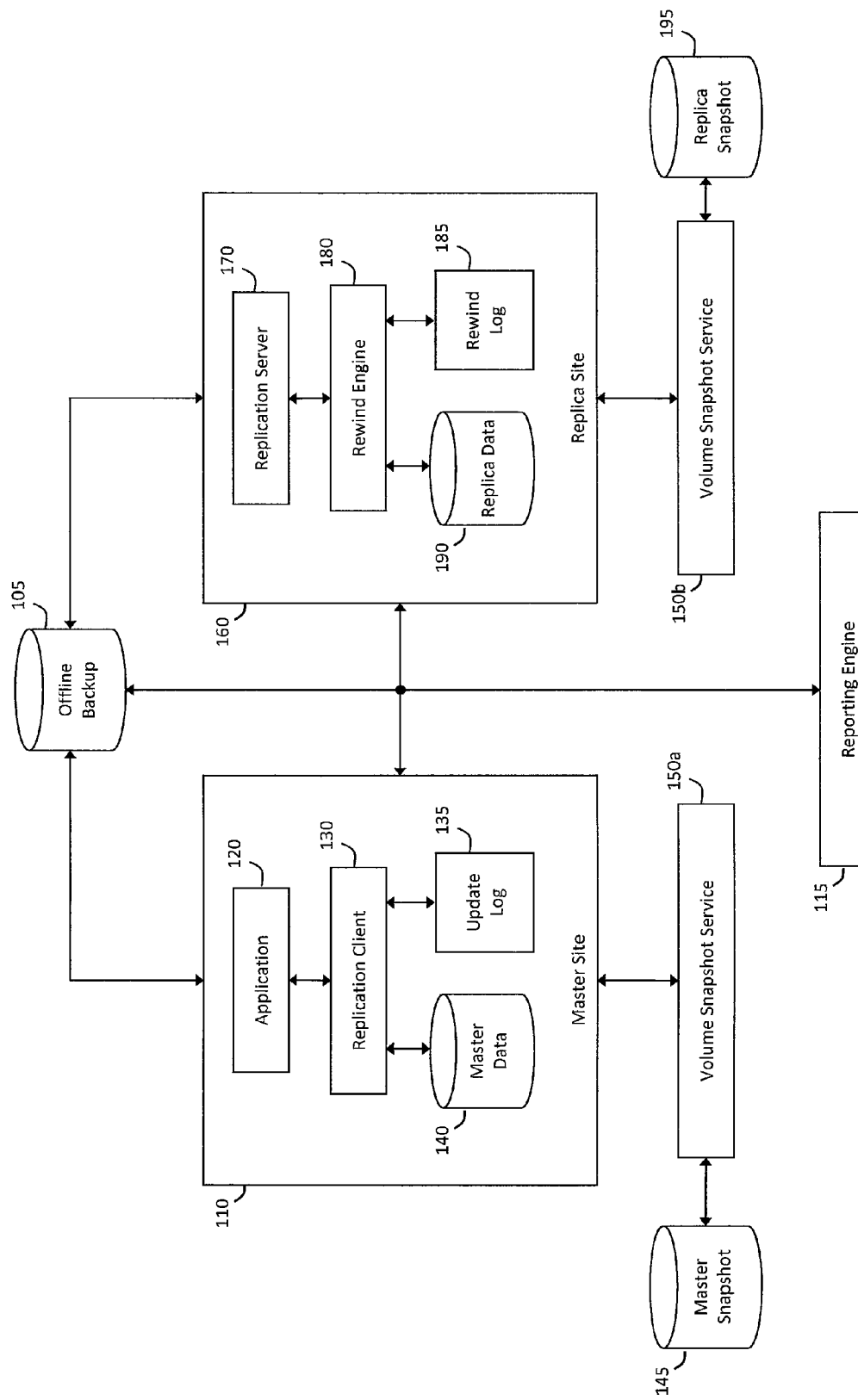
FIG. 1 illustrates an exemplary assured recovery and replication system that can validate consistency between a master data source and a replica data source and recover the master data source from the replica data source, according to one aspect of the invention.

According to one aspect of the invention, FIG. 1 illustrates an exemplary assured recovery and replication system 100 that can validate consistency between a master data source 140 and a replica data source 190 associated with an application 120 and recover the master data source 140 from the replica data source 190. In particular, the system 100 illustrated in FIG. 1 may provide various features that can ensure the master data source 140 will be immediately accessible in emergency or other failure scenarios, wherein the system 100 may include a replica site 160 that maintains the replica data source 190 to provide substantially instantaneous failover and restoration in response to any loss or disruption associated with the master data source 140. Moreover, the system 100 may ensure that a master site 110 associated with the master data source 140 will be prepared to handle actual threats because disaster recovery resources associated with the replica site 160 may proactively test whether the replica data source 190 can be reliably utilized to recover the master data source 140 in response to disaster, loss, or other failure associated therewith.

In one implementation, the replica site 160 may generally be used to check whether the master data source 140 associated with the application 120 has a healthy state, wherein the replica site 160 may include a replication server 170 that can check a replica data source 190 associated with the master data source 140 to verify that the application 120 has a healthy state without substantial impact on replication in the replica site 160. For example, in one implementation, comprehensively and automatically testing the application 120 may include the replication server 170 loading a standby version of the application 120 in the replica site 160 and then testing the standby version of the application 120 and the replica data source 190 associated therewith out disrupting the production version of the application 120 or otherwise interrupting real-time protection for the master data source 140. For example, in response to the production application 120 in the master site 110 applying one or more changes to the master data source 140, the standby application 120 in the replica site 160 may apply the changes to the replica data source 190 using information recorded in an update log 135 to replicate the changes applied to the master data source 140. For example, the master site 110 may include a replication client 130 that uses a device driver or another suitable mechanism to redirect any changes recorded in the update log 135 to the replica site 160, whereby the replica data source 190 may be modified without impacting or otherwise changing the master data source 140 in the production environment associated with the master site 110. In response to suitably redirecting the changes in the update log 135 to the replica site 160 and applying the changes to the replica data source 190, the device driver may then be unloaded and the replication process may be repeated as appropriate in response to subsequent changes that the application 120 makes to the master data source 140. Furthermore, in one implementation, the changes applied to the replica data source 190 may be recorded in a rewind log 185 to preserve a context associated with the application 120 (e.g., the changes recorded in the rewind log 185 may be used to rewind the replica data source 190 and/or the master data source 140 or locate a switch point on the replica data source 190 from where business operations can be suitably resumed in response to a disaster or other failure associated with the master data source 140).

In one implementation, the replica server 170 may further provide assured recovery for the master data source 140 without necessarily loading the standby version of the application 120 in the replica site 160. In particular, loading or otherwise installing the standby version of the application 120 in the replica site 160 may introduce additional costs to buy and manage the application 120 even though certain customers or users may only need the replica site 160 to provide disaster recovery or failover services. Moreover, in scenarios where a particular customer or user consolidates data from multiple master data sources 140 to the replica data source 160, installing or loading multiple applications 120 associated with the multiple master data sources 140 in the replica site 160 may be difficult or impractical. Thus, the replica server 170 may be configured to perform various data consistency checks to provide assured recovery for the master data source 140 (or multiple master data sources 14) without necessarily loading standby versions of the application 120 (or multiple applications 120) in the replica site 160. In either scenario, however, any changes applied to the master data source 140 that are replicated on the replica data source 190 may be recorded in the rewind log 185 to preserve the application 120 context that can be used to restore the replica data source 190 and/or the master data source 140 to a state that enables business operations to be suitably continued following disaster or other failure in the master data source 140.

In one implementation, as will be described in further detail herein, the various data consistency checks performed with the replica server 170 may include maintaining one or more offline backup data sources 105 that store various different snapshots of the master data source 140 and the replica data source 190, wherein the snapshots maintained in the offline backup data sources 105 may be used to recover deleted files or data older than current versions in the master data source 140 or the replica data source 190 (e.g., the snapshots may exposed as a folder or drive letter that can be easily accessed from a graphical or command line interface, and snapshot management quotas may be established to ensure a proper balance between disk space usage and a number of historical snapshots stored in the offline backup data sources 105). Additionally, as will be described in further detail herein, the various data consistency checks performed with the replica server 170 may further include maintaining one or more bookmarks or other integration points that can be used to backup or restore the master data source 140 with the replica data source 190 without disrupting real-time protection for the master data source 140 in the production environment associated with the master site 110. As such, the offline backup data sources 105 may provide additional recovery resources that can be used to preserve the application 120 context and restore the replica data source 190 and/or the master data source 140 to a state that enables business operations to be suitably resumed following disaster or other failure.

In one implementation, the replica server 170 may generally perform one or more data consistency checks during an assured recovery test to verify that the replica data source 190 can be suitably used to recover the master data source 140 in response to disaster, loss, or other failure associated with the master data source 140. In one implementation, the assured recovery test may generally be performed at any suitable time, including at a predefined time, according to a predefined schedule, or on-demand in response to a request from a customer or other suitable user. In one implementation, the assured recovery test may initially establish consistency between the master data source 140 and the replica data source 190 to assure that the master data source 140 and the replica data source 190 are expected to be identical, wherein establishing consistency between the master data source 140 and the replica data source 190 may include appropriately updating the replica data source 190 to reflect any ongoing changes that may be applied to the master data source 140. In particular, as noted above, any changes applied to the master data source 140 may be recorded in the update log 135 and redirected to the replica server 170, which may then appropriately update the replica data source 190. For example, in one implementation, the replication client 130 at the master site 110 may invoke a volume snapshot service 150a that creates a master snapshot 145 to copy the master data source 140. As such, the volume snapshot service 150a may then store the master snapshot 145 in one or more data repositories (e.g., the offline backup data source 105), thereby enabling the master data source 140 to be recovered to a point in time when the master snapshot 140 was created.

In one implementation, in response to suitably creating the master snapshot 145 to copy the master data source 140, the volume snapshot service 150a may further record an application-aware bookmark associated with the master snapshot 145. In particular, the application-aware bookmark may generally associate the master snapshot 145 created from the master data source 140 with the application 120 that interacts with the master data source 140, whereby the application-aware bookmark may distinguish the particular master snapshot 145 associated with the application from multiple master snapshots 145 created from multiple master data sources 140. As such, master snapshots 145 associated with master data sources 140 that multiple different applications 120 use may be suitably stored within one replica data source 190 or offline backup data source 105, which may simplify managing and recovering master data sources 140 associated with different applications 120. In one implementation, in response to the volume snapshot service 150a recording the application-aware bookmark associated with the master snapshot 145, the volume snapshot service 150a may provide the bookmark to the replication client 130 and/or the replication server 170, which may then verify consistency between the replica data source 190 and the master snapshot 145.

For example, in one implementation, verifying that the replica data source 190 and the master snapshot 145 are in a consistent state may include comparing metadata that describes a file system associated with the replica data source 190 to metadata that describes a file system associated with the master snapshot 145 to determine whether any differences exist between the respective file systems. As such, in response to determining that no differences exist between the file system associated with the replica data source 190 and the file system associated with the master snapshot 145, the replication client 130 and/or the replication server 170 may verify that the replica data source 190 and the master snapshot 145 are in a consistent state and capture a snapshot of the replica data source 190 to preserve the consistent state. Alternatively, in response to determining that one or more differences exist between the replica data source 190 and the master snapshot 145, the replication client 130 and/or the replication server 170 may attempt to resolve the differences. For example, in one implementation, attempting to resolve the differences may include the replication server 170 applying any changes in the update log 135 that have not yet been applied and then repeating the attempt to verify consistency between the master snapshot 145 and the replica data source 190 or skipping the step that captures the snapshot of the replica data source 190 until a subsequent assured recovery test successfully validates consistency between the master snapshot 145 and the replica data source 190. Alternatively, in one implementation, the replication server 170 may resolve the differences by validating whether information stored in the replica site 160 can be suitably used within a context associated with the application 120 (e.g., determining whether the rewind log 185 can be suitably used to restore the master data source 140 and/or the replica data source 190 to a prior consistent state, finding a nearest-in-time switch point where the replica data source 190 and the master data source 140 previously had the consistent state, etc.).

In one implementation, verifying that the replica data source 190 and the master snapshot 145 are in a consistent state may alternatively (or additionally) include performing a binary difference comparison between the file system associated with the replica data source 190 and the file system associated with the master snapshot 145. For example, in one implementation, the binary difference comparison may use a Windows Change Journal mechanism to identify one or more files in the replica data source 190 that have changed since a prior comparison and then performing the binary difference comparison between the files that have changed in the replica data source 190 and corresponding files in the master snapshot 145 (e.g., based on techniques described in U.S. patent application Ser. No. 10/188,512, entitled "Method and System for Updating an Archive of a Computer File," filed Jul. 3, 2002, which issued as U.S. Pat. No. 7,730,031 on Jun. 1, 2010, the contents of which are hereby incorporated by reference in their entirety). As such, based on the results from the binary difference comparison, the assured recovery test may verify that the replica data source 190 and the master snapshot 145 are in a consistent state, or alternatively attempt to resolve any inconsistencies, in a substantially similar manner as described in the above implementation that compares metadata associated with the replica data source 190 to metadata associated with the master snapshot 145 (e.g., determining whether information recorded in the rewind log 185 can be suitably used to restore the master data source 140 and/or the replica data source 190 to a prior consistent state, finding a nearest-in-time switch point where the replica data source 190 and the master data source 140 previously had the consistent state, etc.).

Furthermore, in one implementation, a customer or other suitable user may suspend replication between the master data source 140 and the replica data source 190 during the assured recovery test, or alternatively request that replication between the master data source 140 and the replica data source 190 continue during the assured recovery test. For example, in the former case, suspending replication between the master data source 140 and the replica data source 190 may generally include recording any changes applied to the master data source 140 in the update log 135, wherein the replication server 170 may spool or otherwise accumulate the changes recorded in the update log 135 within a spool file and then apply the changes to the replica data source 190 in response to suitably completing the assured recovery test. In response to suitably completing the assured recovery test, a rewind engine 180 may then restore the replica data source 190 to a state that existed prior to the replication server 170 beginning to accumulate or spool the changes recorded in the update log 135, and the replication server 170 may then replicate the accumulated changes on the replica data source 190. For example, in one implementation, to restore the replica data source 190 to the state that existed prior to when the changes to be replicated began to accumulate in the spool file, the rewind engine 180 may use the rewind log 185 to record any changes that occur on the replica data source 190 while performing the verification test. As such, the rewind engine 180 may subsequently rewind the changes that occurred during the verification test to restore the replica data source 190 to the state that existed prior to the verification test (e.g., using techniques described in U.S. patent application Ser. No. 10/981,837, entitled "Replicated Data Validation," filed Nov. 5, 2004, which issued as U.S. Pat. No. 7,840,535 on Nov. 23, 2010, the contents of which are hereby incorporated by reference in their entirety). Furthermore, because suspending replication during the assured recovery test may carry a high likelihood that the assured recovery test will find differences between the replica data source 190 and the master snapshot 145, the rewind log 185 may be further used to find a nearest-in-time point (prior to when replication was suspended) where the replica data source 190 and the master data source 140 had a consistent state and from where production operations can be continued.

In one implementation, in the latter case where the customer or user requests that replication between the master data source 140 and the replica data source 190 continue during the assured recovery test, the replication server 170 may invoke a volume snapshot service 150b substantially similar to the volume snapshot service 150b associated with the master site 110 to create a replica snapshot 195 that represents a copy of the replica data source 190. As such, the assured recovery test may verify consistency between the replica data source 190 and the master snapshot 145 based on a comparison between the replica snapshot 195 and the master snapshot 145, which may be performed in a substantially similar manner as described above with respect to comparing the master snapshot 145 to the actual replica data source 190. Consequently, verifying consistency between the master snapshot 145 and the replica snapshot 195 (rather than the replica data source 190) may permit replication between the master data source 140 and the replica data source 190 to continue during the assured recovery test without impacting live operations on the master data source 140 or replication operations on the replica data source 190.

In one implementation, in response to suitably verifying that the replica data source 190 and the master snapshot 145 are in a consistent state (or in response to finding the nearest-in-time point where the replica data source 190 and the master data source 140 had a consistent state), the replication server 170 may establish that the replica data source 190 and the master data source 140 were consistent with the application 120 at a time when the bookmark associated with the master snapshot 145 was created (or alternatively at the nearest-in-time point). As such, in response to establishing when the replica data source 190 and the master data source 140 had an identical and consistent state, the replica data source 190 may be guaranteed to be in an appropriate state to recover the master data source 140. In one implementation, in response to any subsequent disaster, loss, or other failure associated with the master data source 140, the replica server 170 may then provide assured recovery for the master data source 140 from the replica data source 190 (e.g., the master data source 140 may be monitored substantially continuously to determine whether any potential disaster, loss, or other failure has occurred in the master data source 140 and then trigger recovering the master data source 140 from the replica data source 190, or the assured recovery may be triggered at a predefined time, according to a predefined schedule, or on-demand in response to a request from a customer or other suitable user).

In one implementation, as noted above and as will be described in further detail herein, the master data source 140 may be recovered from the replica data source 190 without loading or otherwise installing a standby version of the application 120 in the replica site 160. Further, because verifying consistency between the replica data source 190 and the master snapshot 145 may change the replica data source 190 and/or the master snapshot 145 (e.g., read and write processes that validate a data source may causes changes thereto), the rewind engine 180 may maintain the rewind log 185 to record any changes that verifying consistency between the replica data source 190 and the master snapshot 145 cause. In particular, as noted above, the rewind engine 180 may reference the rewind log 185 to roll back any such changes and thereby restore the replica data source 190 and/or the master snapshot 145 to a state prior to the verification process. Moreover, the rewind engine 180 may enable granular application-aware recovery from corruption in the master data source 140 or the replica data source 190 (e.g., restoring the master data source 140 or the replica data source 190 to a state prior to the corruption using the information in the rewind log 185, snapshots previously created for the master data source 140 or the replica data source 190, etc.).

For example, in one implementation, the customer or other suitable user associated with the application 120 may request assured recovery from the replica data source 190, wherein the customer or user may further trigger backing up the replica data source 190 to the offline backup data source 105 to further protect the replica data source 190 in case any errors or malfunctions that may occur while recovering the master data source 140 from the replica data source 190 (i.e., saving the replica data source 190 to the offline backup data source 105 may enable the replica data source 190 to be used in recovering the master data source 140 without having to install the application 120 at the replica site 160). In another example, to provide assured recovery from the replica data source 190 without installing the application at the replica site 160 may include a full system protection solution, which may generally include replicating any information associated with the application 120 and an operating system that runs the application 120 from the master data source 140 to a virtual machine disk file stored at the replica site 160. As such, in response to initiating the assured recovery from the replica data source 190, the replication server 170 may invoke the volume snapshot service 150b to create a disk snapshot from the virtual machine disk file. The disk snapshot created from the virtual machine disk file may therefore be used to create a virtual machine using the virtual machine disk file, wherein the virtual machine may represent a virtual appliance or other suitable instantiation that runs the application 120 in the associated operating system. In one implementation, the replication server 170 may then boot the virtual machine created from the virtual machine disk file and verify that the application 120 and the associated operating system have a healthy state in the virtual machine (e.g., verifying that all services associated with the application 120 and the operating system have correctly started and that all databases associated with the application 120 and the operating system have successfully mounted).

In response to confirming that the application 120 and the associated operating system have a healthy state in the virtual machine, the replication server 170 may then assign an identity associated with the master data source 140 to the replica data source 190. For example, the replica server 170 may obtain a name, network address, or other suitable identity information associated with the master data source 140 and assign the identity information to the replica data source 190. The replica data source 190 may then be in a state that can be used to recover the master data source 140, wherein the replication server 170 may transfer control from the master data source 140 to the replica data source 190 (i.e., the replica data source 190 may generally replace the master data source 140 to transfer control). The disk snapshot previously created from the virtual machine disk file may then be reverted to create a new replica data source 140, whereby replication between the new master data source 140 and the new replica data source 140 may then appropriately resume. As such, because the virtual machine disk file enables the replication server 170 to create a virtual instantiation that represents the application 120 and the associated operating system, the replication server 170 may provide assured recovery for the master data source 140 from the replica data source 190 without having to load or otherwise install a live standby version of the application 120 at the replica site 160.

In one implementation, a reporting engine 115 may generate one or more reports to provide that information describes, among other things, delays in replicating the master data source 140 on the replica data source 190, results from the assured recovery test that validates whether the master data source 140 and the replica data source 190 are in a consistent state, and results from performing assured recovery to recover the master data source 140 from the replica data source 190. Thus, as will be described in further detail herein, the system 100 may maintain various statistics that detail correctness and performance associated with replication between the master data source 140 and the replica data source 190.

For example, in one implementation, the replication server 170 may generally replicate the master data source 140 to the replica data source 190 asynchronously (e.g., permitting other operations to continue prior to completing or committing replication operations), whereby delays may occur in replicating the master data source 140 to the replica data source 190. Although the delays will typically be limited to a few seconds, various scenarios may cause longer delays (e.g., complexity or improper configurations in the master site 110 or the replica site 160). As such, because high replication delays may impact integrity or availability associated with the master data source 140 and/or the replica data source 190, the reporting engine 115 may generate reports to provide information describing any delays associated with replicating the master data source 140 on the replica data source 190. For example, in one implementation, the replication client 130, the replication server 170, or any other suitable component associated with the system 100 may add one or more timestamps into various messages or other data packages associated with replicating the master data source 140 on the replica data source 190. As such, the reporting engine 115 may observe the timestamps added to the various messages or other data packages associated with replicating the master data source 140 on the replica data source 190 and then generate a report that describes any delays that occur in various transfer phases associated with replicating the master data source 140 on the replica data source 190. For example, in one implementation, the delays described in the report may detail any delays that occur in the master site 110, in the replica site 160, in a network that transfers the various messages or data packages between the master site 110, the replica site 160, and/or the offline backup data source 105, etc.).

Additionally, in one implementation, the reporting engine 115 may generate a report that provides information describing whether the master data source 140 and the replica data source 190 are correctly replicating (or in a consistent state and therefore correctly configured for replication). For example, in one implementation, in response to the assured recovery test validating that the master data source 140 and the replica data source 190 have a consistent state, the replication client 130 may generate data to simulate one or more operations that modify the master data source 140 (e.g., randomly generated pseudo-data, real data that may be selected from the update log 135, etc.). As such, the replication client 130 may then execute the one or more simulated operations, which may use the generated data to modify the master data source 140, and the replication server 170 may then analyze the replica data source 190 to confirm that the replica data source 190 has been modified to reflect the simulated operations performed on the master data source 140. Accordingly, the reporting engine 115 may then generate a report indicating whether or not the master data source 140 and the replica data source 190 are correctly replicating (or correctly configured to replicate). Further, in scenarios where randomly generated pseudo-data has been used to test whether the master data source 140 and the replica data source 190 are correctly replicating (or correctly configured to replicate), the simulated operations may be stored in the rewind log 185, whereby the rewind engine 180 may then suitably restore the replica data source 190 and the master data source 140 to respective states prior to the replication test. Alternatively, in scenarios where real data selected from the update log 135 has been used to test replication between the master data source 140 and the replica data source 190, the operations may be considered actual operations (rather than simulated operations) and the master data source 140 and the replica data source 190 may commit the changes applied in the test.

Figure 2:
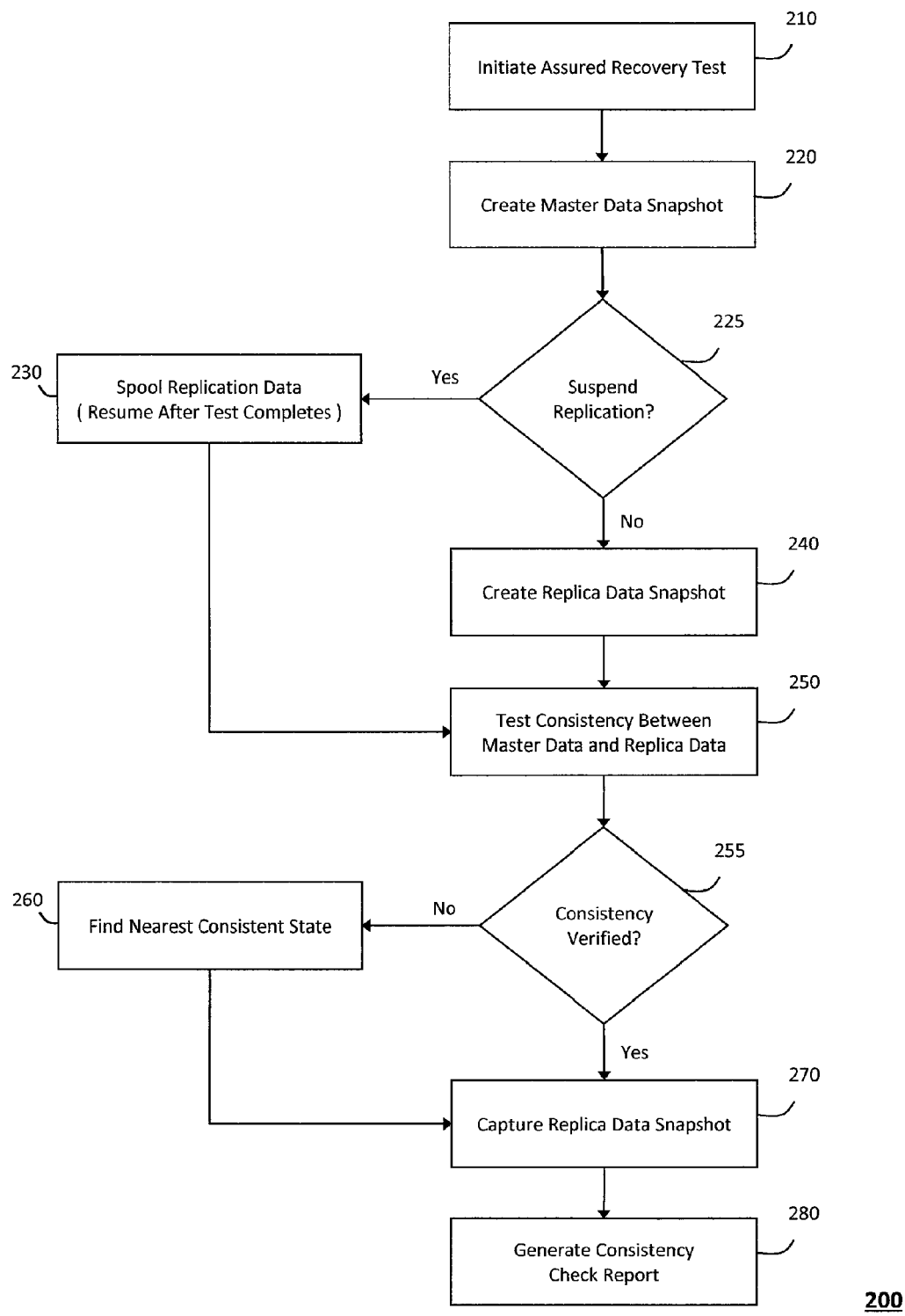
FIG. 2 illustrates an exemplary assured recovery and replication method that validates consistency between a master data source and a replica data source, according to one aspect of the invention.

According to one aspect of the invention, FIG. 2 illustrates an exemplary assured recovery and replication method 200 that validates consistency between a master data source and a replica data source. In particular, the method 200 illustrated in FIG. 2 may generally include proactively testing whether the replica data source can be reliably utilized to recover the master data source in response to disaster, loss, or other failure associated with the master data source, wherein an operation 210 may include initiating an assured recovery test to check whether the master data source and the replica data source have a healthy and consistent state without substantially impacting live operations on the master data source or replication operations on the replica data source. For example, in one implementation, the assured recovery test that verifies whether the master data source and the replica data source have a healthy and consistent state may include invoking a volume snapshot service in an operation 220 to create a master snapshot that represents a copy associated with the master data source, wherein operation 220 may further include storing the master snapshot to enable recovering the master data source to a point in time when the master snapshot was created. In addition, in response to suitably creating the master snapshot, operation 220 may further include recording an application-aware bookmark that associates the master snapshot with an application that interacts with the master data source (e.g., to distinguish the application that interacts with the master snapshot from master snapshots created from master data sources associated with other applications).

In one implementation, an operation 225 may then include determining whether or not to suspend replication between the master data source and the replica data source during the assured recovery test. For example, in response to determining that replication will not be suspended (i.e., replication will continue during the assured recovery test), an operation 240 may include invoking the volume snapshot service to create a replica snapshot that represents a copy of the replica data source, wherein replication between the master data source and the replica data source may then continue without impacting the replica snapshot created to preserve the state that existed when the verification test was initiated. As such, an operation 250 may then include comparing the master snapshot to the replica snapshot (rather than the replica data source) to verify consistency between the replica data source and the master snapshot, whereby replication between the master data source and the replica data source may continue during operation 250 without impacting live operations on the master data source or replication operations on the replica data source. Alternatively, in response to determining that replication will be suspended during the assured recovery test, an operation 230 may begin to spool or otherwise accumulate any changes applied to the master data source in a spool file, wherein replicating the changes accumulated in the spool file may be resumed on the replica data source in response to the verification test suitably completing. For example, in response to suitably completing the verification test, a rewind engine may restore the replica data source to a state prior to when the changes began to spool or otherwise accumulate in the spool file, wherein the replication server may resume replicating the accumulated changes on the replica data source in response to the rewind engine restoring the replica data source to the prior state. In one implementation, in response to suitably suspending replication and spooling the changes to be subsequently replicated in the spool file, the method 200 may proceed to operation 250, which in the suspended replication scenario may include comparing the master snapshot to the replica data source (rather than a snapshot thereof).

In one implementation, testing consistency between the master snapshot and the replica snapshot (or the replica data source) in operation 250 may include comparing metadata that describes the replica snapshot (or the replica data source) to metadata that describes the master snapshot. In particular, comparing the metadata that describes the replica snapshot (or the replica data source) to the metadata that describes the master snapshot may include determining whether any differences exist between the metadata that describes the replica snapshot (or the replica data source) and the metadata that describes the master snapshot. As such, an operation 255 may then include determining whether any differences have been found, and in response to determining that no differences exist between the metadata associated with the master snapshot and the replica snapshot (or the replica data source), operation 255 may verify that the replica data source and the master snapshot have a consistent state. As such, an operation 270 may then capture a snapshot of the replica data source to preserve the consistent state. Alternatively, in response to operation 255 determining that one or more differences exist between the metadata describing the replica snapshot (or the replica data source) and the master snapshot, an operation 260 may include finding a nearest consistent state between the replica data source and the master snapshot. For example, because suspending replication during the assured recovery test may result in a high likelihood that differences will be found in operation 255, the rewind engine may reference a rewind log in operation 260 to find a nearest-in-time point (prior to when replication was suspended) where the replica data source and the master data source had a consistent state and from where production operations can be continued. However, operation 260 may include the rewind engine similarly attempting to find the nearest-in-time point where the replica data source and the master data source had a consistent state and from where production operations can be continued in any scenario where differences are found in operation 255, regardless of whether or not replication was previously suspended.

In one implementation, verifying consistency between the master snapshot and the replica data source (or replica snapshot) in operation 250 may alternatively (or additionally) include performing a binary difference comparison between the master snapshot and the replica data source (or replica snapshot). For example, operation 250 may perform the binary difference comparison on every aspect of a file system associated with the master data source and the replica data source (or replica snapshot) to perform a full consistency check, or a Windows Change Journal mechanism may limit the binary difference comparison to any files in the master snapshot and/or replica data source or replica snapshot that have changed since a prior comparison (e.g., to reduce response time associated with the test). In one implementation, operation 255 may then include determining whether consistency has been verified in a similar manner as described above, and furthermore, operations 260 and 270 may be similarly performed as described above based on whether or not operation 255 results in consistency being verified between the master snapshot and the replica data source.

In one implementation, in response to suitably determining whether or not the replica data source and the master snapshot have a consistent state, an operation 280 may generate a consistency check report to describe results from the assured recovery test. In particular, the report generated in operation 280 may detail whether the master data source and the replica data source are correctly configured to replicate. For example, operation 280 may include generating data to used in one or more operations that modify the master data source (e.g., randomly generated pseudo-data, real data that may be selected from the update log, etc.), wherein the operations may then be executed using the generated data to modify the master data source. As such, operation 280 may further include analyzing the replica data source to determine whether or not the replica data source appropriately reflects any changes caused with the operations performed on the master data source. Accordingly, the report generated in operation 280 may indicate whether the master data source and the replica data source are correctly configured to replicate, including whether operation 260 had to be performed to restore the master data source and/or the replica data source to a previous consistent state nearest-in-time to when the assured recovery test was initiated.

Figure 3:
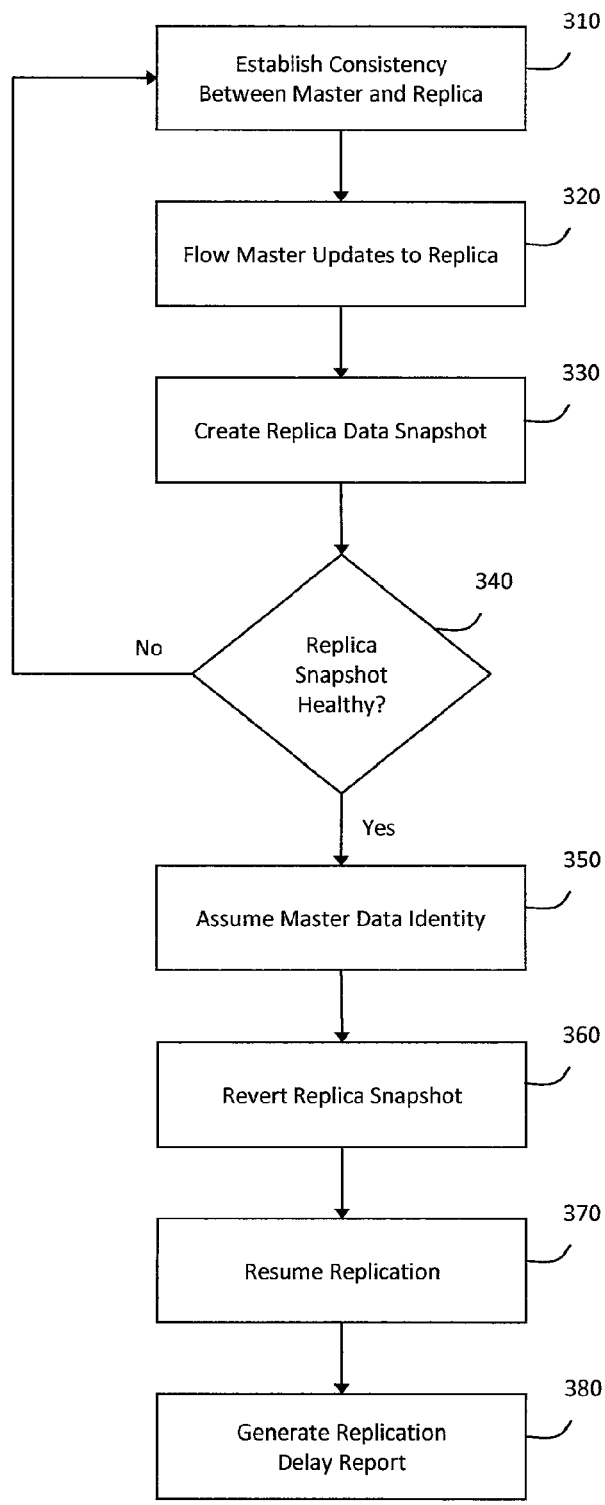
FIG. 3 illustrates an exemplary assured recovery and replication method that recovers a master data source from a replica data source, according to one aspect of the invention.

According to one aspect of the invention, FIG. 3 illustrates an exemplary assured recovery and replication method 300 that can recover a master data source associated with an application from a replica data source further associated with the application. In particular, the method 300 illustrated in FIG. 3 may generally recover the master data source from the replica data source to ensure that the master data source will be immediately accessible in emergency or other failure scenarios, wherein a replica site may maintain the replica data source to provide substantially instantaneous failover and restoration in response to any loss or disruption associated with the master data source. For example, an operation 310 may include establishing that the replica data source and the master snapshot have a consistent state (or the nearest-in-time point when the replica data source and the master previously had a consistent state). For example, in one implementation, operation 310 may generally include performing various operations substantially similar to those shown in FIG. 2 and described in further detail above, and in response to establishing that the replica data source and the master snapshot have an identical and consistent state (or the nearest-in-time point when the replica data source and the master previously had a consistent state), the replica data source may be guaranteed to have an appropriate state to recover the master data source in response to disaster, loss, failure, or another suitable condition that may trigger recovering the master data source.

In one implementation, an operation 320 may then include flowing any updates that modify the master data source to a replica site that maintains the replica data source. In particular, operation 320 may include accumulating any changes applied to the master data source while recovering the master data source in a spool file at the replica site to enable subsequently applying the accumulated changes on the replica data source in response to suitably recovering the master data source. However, prior to applying the accumulated changes on the replica data source, an operation 330 may include replicating any information associated with the application that interacts with the master data source to a virtual machine disk file stored the replica site. As such, the replica site may invoke a volume snapshot service in operation 330 to create a disk snapshot from the virtual machine disk file, wherein the disk snapshot may be used to create a virtual machine image that represents a virtual instantiation associated with the application. In one implementation, the replication server may then boot the virtual machine created from the virtual machine disk file, and an operation 340 may determine whether the virtual machine has a healthy state (e.g., verifying that all services associated with the application 120 and the operating system have correctly started and that all databases associated with the application 120 and the operating system have successfully mounted). In response to determining that the virtual machine corresponding to the replica snapshot does not have a healthy state, processing may return to operation 310 to diagnose or otherwise resolve any errors and reattempt recovering the master data source.

Alternatively, in response to operation 340 confirming that the virtual machine has a healthy state, an identity associated with the master data source may then be assigned to the replica data source in an operation 350, whereby the replica data source may then be ready to recover the master data source. For example, assigning the identity associated with the master data source to the replica data source may transfer control from the master data source to the replica data source, whereby operation 350 may essentially replace the master data source with the replica data source may. In one implementation, an operation 360 may then revert the disk snapshot previously created from the virtual machine disk file to create a new replica data source, and an operation 370 may then resume replication between the new master data source (i.e., the previous replica data source) and the new replica data source. In particular, operation 370 may generally include applying any changes flowed to the replica site and accumulated in the spool file to the new master data source and the new replica data source, whereby the new master data source and the new replica data source may reflect the changes to the master data source that occurred while recovering the master data source.

In one implementation, an operation 380 may then generate a replication delay report to describe any delays in replicating the master data source on the replica data source and whether the master data source was successfully recovered from the replica data source. For example, because replicating the master data source on the replica data source may be suspended while recovering the master data source, and further because replicating the master data source on the replica data source may be performed asynchronously, delays may occur in the replication between the master data source and the replica data source. The report generated in operation 380 may therefore describe any delays associated with replicating the master data source on the replica data source or accumulating the changes applied to the original master data source while performing assured recovery from the replica data source. For example, various components that are involved with replicating the master data source on the replica data source, accumulating the changes applied to the original master data source, and performing assured recovery from the replica data source may add timestamps to any messages or data packages associated therewith, wherein the report generated in operation 390 may describe any delays that occur in various transfer phases associated with replicating or recovering the master data source. Additionally, the report may describe whether the recovered master data source and the new replica data source are correctly replicating. For example, operation 290 may include generating data to use in one or more test operations that modify the master data source, wherein the operations may be executed using the generated data to modify the master data source. In one implementation, the replica data source may then be analyzed to determine whether or not the new replica data source reflects any changes that the test operations applied to the recovered master data source, whereby the report may indicate whether the recovered master data source and the new replica data source are correctly replicating.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system to provide assured recovery and replication, the system comprising:
 a replication server in communication with a master data source configured to store application data and a replica data source configured to replicate the application data stored in the master data source, wherein the replication server comprises a processor comprising hardware, the processor configured to:
  confirm that the master data source can be recovered from the replica data source in response to validating that the application data copied in a master snapshot associated with the master data source and the application data replicated in the replica data source have a consistent state, wherein the master snapshot copies the application data stored in the master data source;
  create a replica snapshot associated with the replica data source in response to a request to recover the master data source from the replica data source, wherein the replica snapshot copies the application data replicated in the replica data source;
  assign an identity associated with the master data source to the replica data source to transfer control over storing the application data from the master data source to the replica data source; and
  replicate the application data on a virtual machine disk file associated with the replica snapshot.

2. The system of claim 1, further comprising a volume snapshot service configured to create the master snapshot, wherein the volume snapshot service is further configured to record a bookmark associated with the master snapshot to distinguish the master snapshot from an additional master snapshot created with the volume snapshot service.

3. The system of claim 1, wherein the processor associated with the replication server is further configured to:
 compare metadata that describes the master snapshot to metadata that describes the replica data source;
 validate the consistent state between the master snapshot and the replica data source in response to confirming that no difference exists between the metadata that describes the master snapshot and the metadata that describes the replica data source; and
 establish the consistent state between the master snapshot and the replica data source at a nearest previous point in time in response to determining that a difference exists between the metadata that describes the master snapshot and the metadata that describes the replica data source.

4. The system of claim 1, wherein the processor associated with the replication server is further configured to:
 perform a binary difference comparison between the master snapshot and the replica data source;
 validate the consistent state between the master snapshot and the replica data source in response to the binary difference comparison confirming that no difference exists between the master snapshot and the replica data source; and
 establish the consistent state between the master snapshot and the replica data source at a nearest previous point in time in response to the binary difference comparison identifying a difference between the master snapshot and the replica data source.

5. The system of claim 4, wherein the processor associated with the replication server is further configured to limit the binary difference comparison to a file that has changed in the master snapshot or the replica data source.

6. The system of claim 1, wherein the processor associated with the replication server is further configured to:
 suspend replication of the application data stored in the master data source to the replica data source while validating the consistent state between the master snapshot and the replica data source; and
 resume replication of the application data stored in the master data source to the replica data source in response to validating the consistent state between the master snapshot and the replica data source.

7. The system of claim 1, wherein the processor associated with the replication server is further configured to:
 compare the master snapshot to the replica snapshot associated with the replica data source to validate the consistent state between the master snapshot and the replica data source; and
 permit replication of the application data stared in the master data source to the replica data source while comparing the master snapshot to the replica snapshot to validate the consistent state between the master snapshot and the replica data source.

8. The system of claim 1, wherein the processor associated with the replication server is further configured to:

replicate information associated with an application and an operating system that interacts with the master data source to the virtual machine disk file;

create the replica snapshot associated with the replica data source from the virtual machine disk file;

boot a virtual machine created from the virtual machine disk file; and assign the identity associated with the master data source to the replica data source in response to verifying that the application and the operating system have a healthy state in the virtual machine created from the virtual machine disk file.

9. The system of claim 1, wherein the processor is further configured to generate a report that describes any delay associated with replication of the application data to the replica data source or the virtual machine disk file based on a timestamp in a message associated with replication of the application data.

10. The system of claim 1, wherein the processor is further configured to:

execute an operation that applies a change to the application data stored in the master data source; and generate a report that describes whether the master data source and the replica data source are correctly replicating based on whether the change applied to the master data source has been applied to the replica data source.

11. A method to provide assured recovery and replication, the method comprising:

confirming that a master data source can be recovered from a replica data source, the replica data source replicating application data stored in the master data source, in response to a replication server validating that the application data copied in a master snapshot associated with the master data source and the application data replicated in the replica data source have a consistent state, wherein the master snapshot copies the application data stored in the master data source;

creating a replica snapshot associated with the replica data source in response to a request to recover the master data source from the replica data source, wherein the replica snapshot copies the application data replicated in the replica data source;

assigning an identity associated with the master data source to the replica data source, wherein the replication server assigns the identity associated with the master data source to the replica data source to cause the replica data source to assume control over storing the application data from the master data source; and replicating the application data on a virtual machine disk file associated with the replica snapshot in response to the replica data source assuming control over storing the application data from the master data source.

12. The method of claim 11, further comprising invoking a volume snapshot service to create the master snapshot, wherein the volume snapshot service records a bookmark associated with the master snapshot to distinguish the master snapshot from an additional master snapshot created with the volume snapshot service.

13. The method of claim 11, further comprising:

comparing metadata that describes the master snapshot to metadata that describes the replica data source;

validating the consistent state between the master snapshot and the replica data source in response to confirming that no difference exists between the metadata that describes the master snapshot and the metadata that describes the replica data source; and establishing the consistent state between the master snapshot and the replica data source at a nearest previous point in time in response to determining that a difference exists between the metadata that describes the master snapshot and the metadata that describes the replica data source.

14. The method of claim 11, further comprising:

performing a binary difference comparison between the master snapshot and the replica data source;

validating the consistent state between the master snapshot and the replica data source in response to the binary difference comparison confirming that no difference exists between the master snapshot and the replica data source; and establishing the consistent state between the master snapshot and the replica data source at a nearest previous point in time in response to the binary difference comparison identifying a difference between the master snapshot and the replica data source.

15. The method of claim 14, further comprising limiting the binary difference comparison to a file that has changed in the master snapshot or the replica data source.

16. The method of claim 11, further comprising:

suspending replication between the application data stored in the master data source and the replicated application data stored in the replica data source while validating the consistent state between the master snapshot and the replica data source; and resuming replication between the application data stored in the master data source and the replicated application data stored in the replica data source in response to validating the consistent state between the master snapshot and the replica data source.

17. The method of claim 11, further comprising:

comparing the master snapshot to the replica snapshot associated with the replica data source to validate the consistent state between the master snapshot and the replica data source; and permit replication between the application data stored in the master data source and the replicated application data stored in the replica data source while validating the consistent state between the master snapshot and the replica data source.

18. The method of claim 11, further comprising:

replicating information associated with an application and an operating system that interacts with the master data source to the virtual machine disk;

creating the replica snapshot associated with the replica data source from the virtual machine disk file;

booting a virtual machine created from the virtual machine disk file; and assigning the identity associated with the master data source to the replica data source in response to verifying that the application and the operating system have a healthy state in the virtual machine created from the virtual machine disk file.

19. The method of claim 11, further comprising generating a report that describes any delay associated with replicating the application data to the replica data source or the virtual machine disk file based on a timestamp in a message associated with replicating the application data.

20. The method of claim 11, further comprising:

executing an operation that applies a change to the application data stored in the master data source; and generating a report that describes whether the master data source and the replica data source are correctly replicating based on whether the change applied to the master data source has been applied to the replica data source.

21. A computer program product comprising:
a non-transitory computer readable storage medium comprising computer-readable program code embodied therewith to provide assured recovery and replication, the computer readable program code comprising:
computer readable program code configured to confirm that a master data source can be recovered from a replica data source, the replica data source replicating application data stored in the master data source, in response to a replication server validating that the application data copied in a master snapshot associated with the master data source and the application data replicated in the replica data source have a consistent state, wherein the master snapshot copies the application data stored in the master data source;
computer readable program code configured to create a replica snapshot associated with the replica data source in response to a request to recover the master data source from the replica data source, wherein the replica snapshot copies the application data replicated in the replica data source;
computer readable program code configured to assign an identity associated with the master data source to the replica data source, wherein the replication server assigns the identity associated with the master data source to the replica data source to cause the replica data source to assume control over storing the application data from the master data source; and
computer readable program code configured to replicate the application data on a virtual machine disk file associated with the replica snapshot in response to the replica data source assuming control over storing the application data from the master data source.

22. The computer program product of claim 21, further comprising:
computer readable program code configured to compare metadata that describes the master snapshot to metadata that describes the replica data source;
computer readable program code configured to validate the consistent state between the master snapshot and the replica data source in response to confirming that no difference exists between the metadata that describes the master snapshot and the metadata that describes the replica data source; and
computer readable program code configured to establish the consistent state between the master snapshot and the replica data source at a nearest previous point in time in response to determining that a difference exists between the metadata that describes the master snapshot and the metadata that describes the replica data source.

23. The computer program product of claim 21, further comprising:
computer readable program code configured to perform a binary difference comparison between the master snapshot and the replica data source;
computer readable program code configured to validate the consistent state between the master snapshot and the replica data source in response to the binary difference comparison confirming that no difference exists between the master snapshot and the replica data source; and
computer readable program code configured to establish the consistent state between the master snapshot and the replica data source at a nearest previous point in time in response to the binary difference comparison identifying a difference between the master snapshot and the replica data source.

24. The computer program product of claim 21, further comprising:
computer readable program code configured to suspend replication between the application data stored in the master data source and the replicated application data stored in the replica data source while validating the consistent state between the master snapshot and the replica data source; and
computer readable program code configured to resume replication between the application data stored in the master data source and the replicated application data stored in the replica data source in response to validating the consistent state between the master snapshot and the replica data source.

25. The computer program product of claim 21, further comprising:
computer readable program code configured to compare the master snapshot to the replica snapshot associated with the replica data source to validate the consistent state between the master snapshot and the replica data source; and
computer readable program code configured to permit replication between the application data stored in the master data source and the replicated application data stored in the replica data source while validating the consistent state between the master snapshot and the replica data source.

26. The computer program product of claim 21, further comprising:
computer readable program code configured to replicating information associated with an application and an operating system that interacts with the master data source to the virtual machine disk file;
computer readable program code configured to create the replica snapshot associated with the replica data source from the virtual machine disk file;
computer readable program code configured to boot a virtual machine created from the virtual machine disk file; and
computer readable program code configured to assign the identity associated with the master data source to the replica data source in response to verifying that the application and the operating system have a healthy state in the virtual machine created from the virtual machine disk file.

27. The computer program product of claim 21, further comprising computer readable program code configured to generate a report that describes any delay associated with replicating the application data to the replica data source or the virtual machine disk file based on a timestamp in a message associated with replicating the application data.

28. The computer program product of claim 21, further comprising:
computer readable program code configured to execute an operation that applies a change to the application data stored in the master data source; and
computer readable program code configured to generate a report that describes whether the master data source and the replica data source are correctly replicating based on whether the change applied to the master data source has been applied to the replica data source.

* * * * *

UNITED STATES PATENT AND TRADEMARK OFFICE
CERTIFICATE OF CORRECTION

PATENT NO. : 8,495,019 B2
APPLICATION NO. : 13/043201
DATED : July 23, 2013
INVENTOR(S) : Liu Shisheng et al.

It is certified that error appears in the above-identified patent and that said Letters Patent is hereby corrected as shown below:

In the Claims:

Column 20, line 61 (claim 7, line 7) please change "data stared" to -- data stored --

Column 22, line 48 (claim 18, line 4) please change "machine disk" to -- machine disk file --

Signed and Sealed this
Twenty-ninth Day of October, 2013

Teresa Stanek Rea
*Deputy Director of the United States Patent and Trademark Office*